US005339724A

United States Patent [19]

Rösgren et al.

[11] Patent Number: 5,339,724

[45] Date of Patent: Aug. 23, 1994

[54] ARRANGEMENT FOR THE LUBRICATION OF THE PISTON MEMBER OF A FUEL INJECTION PUMP

[75] Inventors: Carl-Erik Rösgren, Vikby; Ilmo Leino, Vaasa, both of Finland

[73] Assignee: Wartsila Diesel International Ltd. Oy, Helsinki, Finland

[21] Appl. No.: 21,775

[22] Filed: Feb. 24, 1993

Related U.S. Application Data

[63] Continuation-in-part of Ser. No. 841,564, Feb. 25, 1992, abandoned.

[30] Foreign Application Priority Data

Mar. 5, 1991 [FI] Finland ................................. 911088

[51] Int. Cl.5 ......................... F01B 31/10; F16N 1/00

[52] U.S. Cl. ........................................ 92/153; 184/18; 184/24

[58] Field of Search ................... 92/82, 153, 154, 155, 92/158, 159, 160; 91/490; 184/18, 24; 123/446, 447

[56] References Cited

U.S. PATENT DOCUMENTS

| | | | |
|---|---|---|---|
| 1,849,208 | 3/1932 | Slatcher | 92/154 |
| 2,330,781 | 9/1943 | Langmyhr et al. | 92/153 |
| 2,689,626 | 9/1981 | Peters | 184/24 |
| 4,279,517 | 7/1981 | Wallner et al. | 184/18 |
| 4,811,899 | 3/1989 | Egler | 123/447 X |
| 4,841,936 | 6/1989 | Takahasai | 123/447 |
| 5,025,768 | 6/1991 | Eckert | 123/447 X |
| 5,119,786 | 6/1992 | Collingborn et al. | 123/447 |

FOREIGN PATENT DOCUMENTS

| | | | |
|---|---|---|---|
| 498084 | 9/1950 | Belgium | 184/18 |
| 68650 | 2/1949 | Denmark | 92/153 |
| 831038 | 2/1952 | Fed. Rep. of Germany . | |
| 2833139 | 2/1979 | Fed. Rep. of Germany . | |
| 757124 | 9/1956 | United Kingdom | 184/24 |
| 2139296A | 11/1984 | United Kingdom . | |

*Primary Examiner*—Edward K. Look
*Assistant Examiner*—Hoang Nguyen
*Attorney, Agent, or Firm*—Smith-Hill and Bedell

[57] ABSTRACT

An improved lubrication arrangement for a piston member arranged to be reciprocatingly movable in a cylinder element of an injection pump for fuel or the like pressure medium, wherein lubricant is supplied under pressure into a lubrication groove arranged in the cylinder element and encircling the piston member. The flow-through of the lubricant is improved by providing the cylinder element with at least one channel extending in the longitudinal direction of the cylinder element, which channel is connected with the lubrication groove for leading lubricant continuously into another position on the mantle surface of the piston member at a distance from the lubrication groove further to be recovered and for possible recirculation.

15 Claims, 2 Drawing Sheets

ARRANGEMENT FOR THE LUBRICATION OF THE PISTON MEMBER OF A FUEL INJECTION PUMP

CROSS-REFERENCE TO RELATED APPLICATION

This application is a continuation-in-part of co-pending application Ser. No. 07/841,564 filed Feb. 25, 1992 now abandoned.

BACKGROUND OF THE INVENTION

The invention relates to an arrangement for the lubrication of the piston member of an injection pump for fuel or the like pressure medium.

Feeding of fuel into a cylinder of an internal combustion engine by means of an injection pump takes place under high pressure. For this reason, the clearance between the sliding surfaces of the cylinder element and the piston member of the pump is very tight, only some thousandths of millimeter, so that fuel could not essentially leak therethrough into the inner parts of the pump. Generally, the purpose of the lubrication system for the piston member of an injection pump is not only to provide lubrication of the piston but also to make said clearance more tight and, thus, to prevent for its part fuel leakages. In addition, the lubrication provides cooling, protection and purification.

In known lubrication systems, the lubrication oil is led into said clearance by making use of pressure. Due to the narrowness of the clearance, however, the oil flow is slow, even at a high feeding pressure. In addition, the lubrication oil warms up in the narrow clearance so that it exceeds desired values, about 110°–115° C. for mineral oils, whereby especially in a big diesel engine when heavy oil is used as fuel the warmed-up lubrication oil reacts more easily with the fuel and forms a sticky lacquer and carbon deposit, which can make it more difficult for the piston member to move in the cylinder and may even cause the feeding ducts for the lubrication oil to become entirely obstructed. It should be observed that in the context of this invention the term "big diesel engine" refers to a diesel engine that is suitable for use as a main propulsion engine or an auxiliary engine for a ship, or in diesel heating power plants, etc.

SUMMARY OF THE INVENTION

An aim of the invention is to provide a new improved lubrication system for the piston member of an injection pump, from which the drawbacks appearing in known systems especially in connection with big diesel engines using heavy oil as a fuel have essentially been eliminated.

By means of the lubrication system according to the invention, the lubrication oil flow can be improved, whereby its temperature remains lower and the impurities can be removed more effectively. The improved effect can also be obtained using a lower feed pressure than in known systems.

Flow-through of the lubrication oil can be further improved by arranging the channel that extends in the longitudinal direction of the cylinder element at least substantially on the opposite side of the cylinder element with regard to the location for supplying the lubrication oil.

An advantageous solution in view of the lubrication and purification is obtained when the cylinder element includes a separate lubrication channel encircling the piston member and arranged at a distance from said lubrication groove, said lubrication channel being connected to said channel extending in the longitudinal direction of the cylinder element and being arranged in connection with the mantle surface of the piston member for improving the lubrication. This lubrication channel can be connected to the mantle surface of the piston member through one or several nozzle orifices or the like for accomplishing splash lubrication in the lower part of the piston.

Further, a substantial clearance can be arranged between the cylinder element and the piston member, extending from the space for recovering lubricant to the position of the lubrication channel for leading lubricant from said lubrication channel along the mantle surface of the piston member freely into a collecting basin or a corresponding space for receiving lubricant in order to be recovered.

BRIEF DESCRIPTION OF THE DRAWINGS

In the following, the invention is described more in detail with reference to the attached drawings, in which.

DETAILED DESCRIPTION

Figure 1:
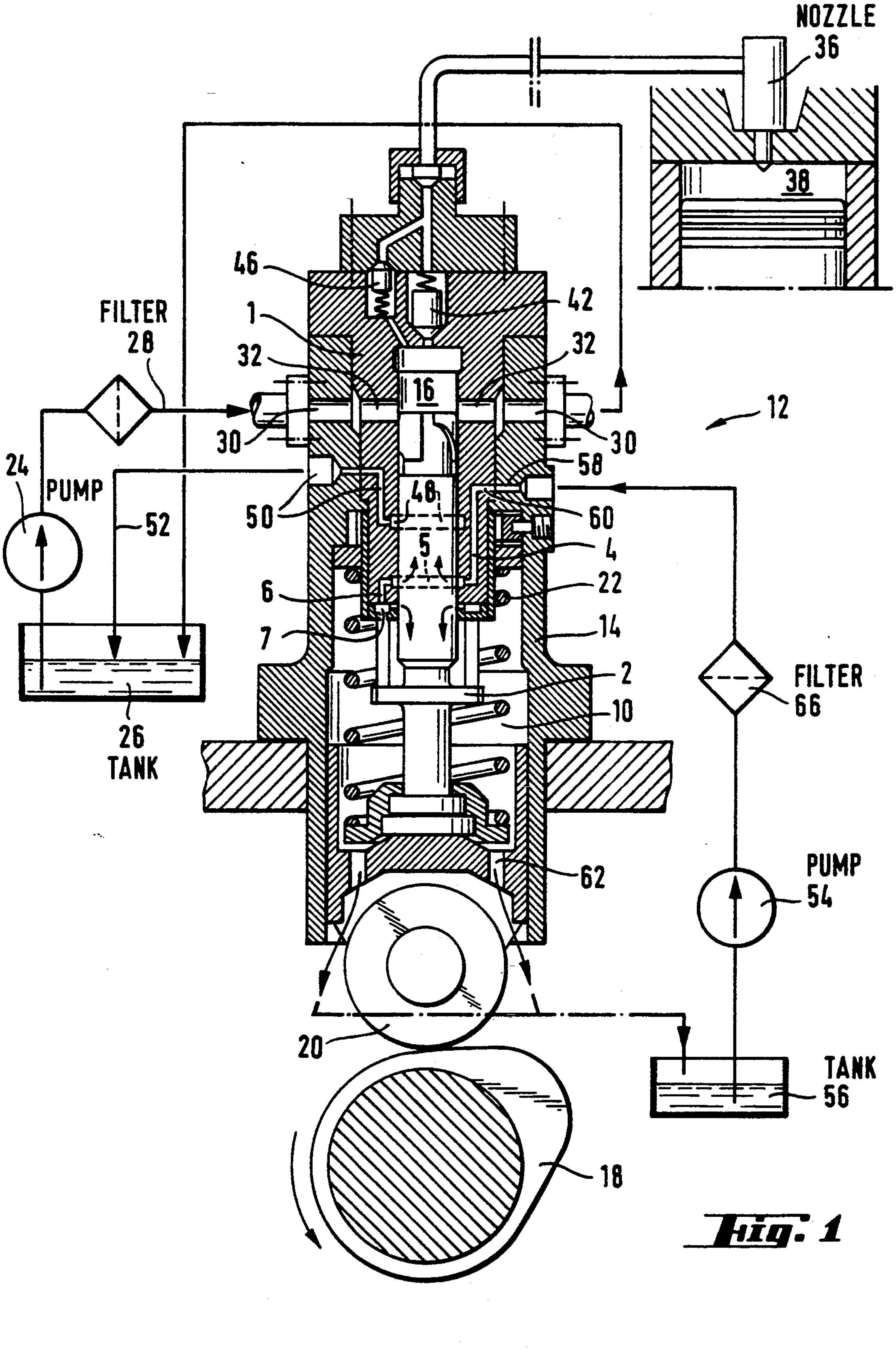
FIG. 1 is a schematic partial view of an internal combustion engine showing a fuel injection pump in accordance with the invention and other components.

Referring to FIG. 1, the fuel injection pump 12 comprises an outer housing 14, a cylinder element 1 that fits partially within the outer housing, and a piston member 2 that is slidable within the cylinder element. A clearance 3 (FIG. 2) exists between the piston member and the cylinder element, and a fuel injection chamber 16 is defined within the cylinder element above the piston member. The piston member 2 is periodically driven upwards against the force of a compression spring 22 by a rotary cam 18 that is driven by the internal combustion engine and acts against the piston member through a follower 20. Accordingly, the piston member 2 reciprocates within the cylinder element 1. A low pressure fuel pump 24 delivers fuel oil from a tank 26 to the fuel injection pump 12 by way of tubing 28 connected to bores 30, 32 in the outer housing 14 and the cylinder element 1. The reciprocating movement of the piston member 2 within the cylinder element 1 allows fuel oil to enter the fuel injection chamber 16 and delivers fuel oil to an injection nozzle 36, which is mounted for injecting fuel into a cylinder 38 of an internal combustion engine, particularly a big diesel engine, through a check valve 42. A pressure relief valve 46 allows fuel to return to the fuel injection chamber of the fuel injection pump when the piston member is moving downwards.

Figure 2:
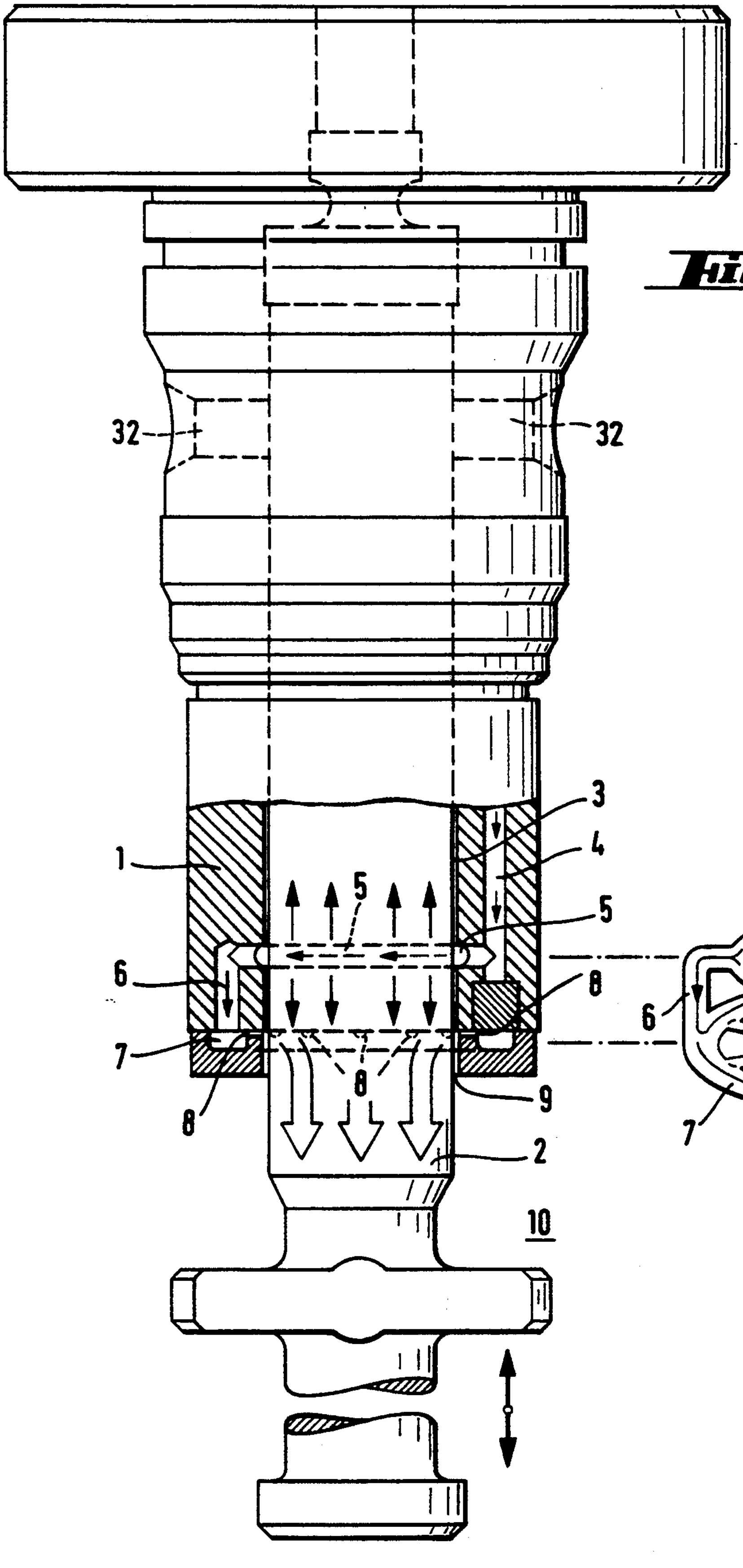
FIG. 2 is as a more detailed cross-sectional view of the cylinder element and piston member of the fuel injection pump.
Figure 3:
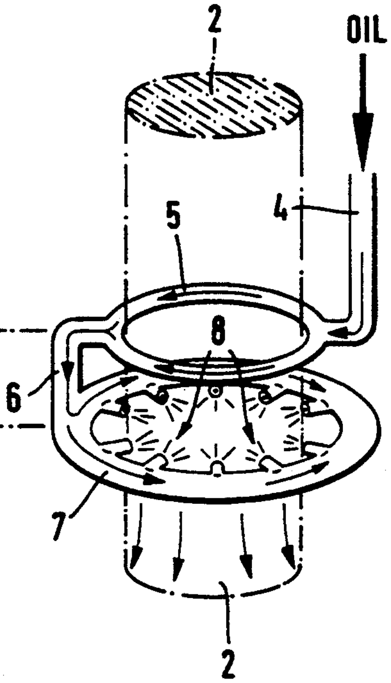
FIG. 3 shows schematically circulation of lubrication oil in the cylinder element of the pump in accordance with the arrangement of FIG. 2.

As a consequence of the high pressure that exists in the fuel injection chamber during normal operation of an injection pump, fuel tends to flow into the clearance 3 between the sliding surfaces of the cylinder element 1 and the piston member 2 away from the fuel injection chamber, i.e., downwards in FIG. 2. The cylinder element 1 is formed with a groove 48 that collects fuel oil that passes downwardly in the clearance 3 between the cylinder element and the piston member, and this groove communicates through bores 50 in the cylinder element 1 and the outer housing 14 with a tube 52 for returning fuel to the tank 26. However, fuel flows beyond the groove 48 into the inner parts of the pump, and mixes with lubricating oil that is supplied to lubricate movement of the piston member. Especially in big diesel engines when heavy oil is used as fuel, the mixture of the fuel and the oil used for lubricating the clearance 3 tends to become a sticky lacquer or form carbon deposits due to the high temperature. In accordance with the invention the prevention of this phenomenon is accomplished by improving the lubricating oil flow, whereby the oil temperature can be decreased and the impurities causing carbon deposit can be removed.

A lubricating oil pump 54 delivers lubricating oil from a reservoir 56 to a bore 58 in the outer housing that is aligned with a bore 60 in the cylinder element. The bore 60 communicates with a channel 4 in the cylinder element 1, and accordingly the lubricating oil is led along the channel 4 into a lubrication groove 5 formed in the cylinder element 1 and encircling the piston member 2. From the lubrication groove 5, the lubricating oil is led along a channel 6 extending in the longitudinal direction of the cylinder element into a lubrication channel 7, which also encircles the piston member 2 and is spaced from the lubrication groove 5 in the direction away from the pressure chamber of the pump. Around the lubrication channel 7, there are a number of nozzle orifices 8, through which the channel 7 is in connection with the mantle surface of the piston member 2. Thanks to the nozzle orifices 8, the cross-sectional area of which is suitably restricted in comparison with the channel 7, the mantle surface comes under splash lubrication, whereby the correspondingly more effective sprays of lubrication oil improve the lubrication and forward removal of impurities. At the same time, the nozzle orifices 8 serve for restricting excessive flow-through of lubricating oil allowing the lubricating oil to affect the mantle surface of the piston member sufficiently also through the lubrication groove 5.

After the nozzle orifices 8, the lubricating oil is led along the mantle surface of the piston member 2 through a clearance 9 into a space 10 inside the pump, from which it can be recovered by way of channels 62 whereby the oil is returned to the oil reservoir 56. A filter 66 prevents circulation of impurities that are carried into the oil reservoir with the return oil flow.

In FIG. 2, the circulation of lubrication oil according to the embodiment of FIG. 1 is illustrated by showing only the lubrication oil channels and flows.

In principle the nozzle orifices 8 can be formed in different ways, but a circular aperture is of rather an optimum form for removing also larger particles of impurities. Instead of discrete apertures for instance one or several slots encircling the piston member are feasible as well, but the breadth of a slot that restricts the volume of flow such that it corresponds to that through discrete nozzle orifices with a certain diameter, is considerably smaller than the diameter of the orifices, so that the slot only allows passage of particles of impurities that are correspondingly smaller in cross-section.

Locating the channel 6 on the opposite side of the cylinder element 1 with regard to the feeding channel 4 provides a favorable flow-through for oil and provides for lubrication around the mantle surface of the piston member 2. The location of channel 6, however, can be changed according to need. It is also feasible to provide the cylinder element 1 with several channels 6 as well as with several feeding channels 4, when only the dimensions of the channels are taken into account so as to provide a suitable circulation and lubrication.

The invention is not restricted to the embodiment shown, but several modifications are feasible within the scope of the attached claims.

We claim:

1. An internal combustion engine comprising lubricant supply means for supplying lubricant under pressure, at least one injection nozzle for introducing fuel under pressure into a cylinder of the engine, a fuel injection pump connected to deliver fuel from a fuel source to the injection nozzle, said fuel injection pump comprising an elongate cylinder element and a piston member reciprocatingly movable in the cylinder element, the cylinder element being formed with at least one lubrication groove that encircles the piston member, a passage connected to the lubricant supply means for supplying lubricant under pressure to the lubrication groove, and a longitudinal channel connected to the lubrication groove and extending longitudinally of the cylinder element for leading lubricant continuously from the lubrication groove to a location that is spaced from the groove and at which the channel debouches from the cylinder element towards the piston member.

2. An internal combustion engine according to claim 1, wherein the longitudinal channel is angularly spaced about the cylinder element from the passage.

3. An internal combustion engine according to claim 2, wherein the longitudinal channel is disposed substantially diametrically opposite the passage with respect to the cylinder element.

4. An internal combustion engine according to claim 1, wherein the lubrication groove is endless, the passage is connected to the lubrication groove by a first bore in the cylinder element and the longitudinal channel is connected to the lubrication groove by a second bore in the cylinder element, said second bore being angularly spaced about the cylinder element from the first bore, whereby two arcuate paths about the piston member are defined for flow of lubricant from the first bore to the second bore.

5. An internal combustion engine according to claim 1, wherein the cylinder element is formed with a lubrication channel that is spaced from the lubrication groove and encircles the piston member, said lubrication channel being connected to said longitudinal channel and providing lubricant to the surface of the piston member.

6. An internal combustion engine according to claim 5, wherein the cylinder element is formed with at least one bore that extends from the lubrication channel and debouches from the cylinder element towards the piston member.

7. An internal combustion engine according to claim 6, wherein the cylinder element is formed with a plurality of bores that are angularly spaced about the cylinder element and debouch from the cylinder element towards the piston member.

8. An internal combustion engine according to claim 5, wherein the cylinder element has an end from which the piston member projects and the lubrication channel is located between the lubrication groove and said end of the cylinder element, there being a clearance between the cylinder element and the piston member that is substantially greater in radial extent between the lubrication channel and said end of the cylinder element than in the vicinity of the lubrication groove, whereby lubricant is able to flow from the lubrication channel along the exterior surface of the piston member beyond said end of the cylinder element for recovery.

9. An internal combustion engine according claim 8, wherein the pump defines a space for collection of lubricant, said space being in communication with said clearance, whereby lubricant that flows through said clearance can be collected in said space for recovery, and wherein the engine further comprises means for returning the recovered lubricant to the lubricant supply means.

10. An internal combustion engine according to claim 1, wherein the cylinder element has one end from which the piston member projects and also has an opposite end, and the passage extends towards the lubrication groove in the direction from said opposite end of the cylinder element towards said one end thereof.

11. An internal combustion engine comprising lubricant supply means for supplying lubricant under pressure, at least one injection nozzle for introducing fuel under pressure into a cylinder of the engine, a fuel injection pump connected to deliver fuel from a fuel source to the injection nozzle, said fuel injection pump comprising an elongate cylinder element having an interior surface and a piston member having an exterior mantle surface and reciprocatingly movable in the cylinder element, the cylinder element being formed with at least one endless lubrication groove that encircles the piston member, a passage connected to the lubricant supply means for supplying lubricant under pressure to the lubrication groove, a lubrication channel that encircles the piston member and is spaced from the lubrication groove, an unthrottled channel extending longitudinally of the cylinder element and connecting the lubrication groove to the lubrication channel for leading lubricant continuously from the lubrication groove to the lubrication channel, and at least one opening that extends from the lubrication channel and debouches from the cylinder element towards the piston member, whereby lubricant that is supplied to the lubrication groove passes through the longitudinal channel to the lubricant channel and thence through the opening to the mantle surface of the piston member.

12. An internal combustion engine according to claim 11, wherein the piston member projects from the cylinder element at one end thereof, the lubrication channel is disposed between the lubrication groove and said one end of the cylinder element, and the clearance between the cylinder element and the mantle surface of the piston member is substantially greater between the opening and said one end of the cylinder member than between the lubrication groove and the opening, whereby lubricant that passes through said opening flows readily along the mantle surface of the piston member towards said one end of the cylinder member.

13. An internal combustion engine according to claim 11, wherein the cylinder element has one end from which the piston member projects and also has an opposite end, and the passage extends towards the lubrication groove in the direction from said opposite end of the cylinder element towards said one end thereof.

14. An internal combustion engine according to claim 11, wherein the cylinder element has one end from which a portion of the piston member projects and also has an opposite end at which it defines a pumping chamber connected to receive fuel from the fuel source and deliver fuel to the injection nozzle, and the engine further comprises drive means engaging said portion of the piston member for driving the piston member toward said opposite end of the cylinder element.

15. An internal combustion engine according to claim 1, wherein the cylinder element has one end from which a portion of the piston member projects and also has an opposite end, and the engine further comprises drive means engaging said portion of the piston member for driving the piston member toward said opposite end of the cylinder element.

* * * * *